(No Model.)
C. S. WHITE.
GASOLENE FILTER.
No. 604,450.  Patented May 24, 1898.
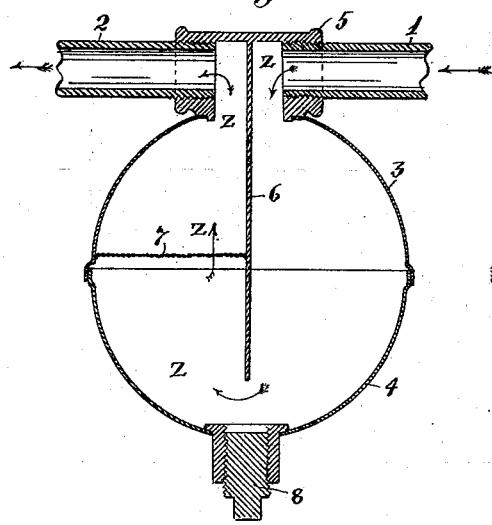
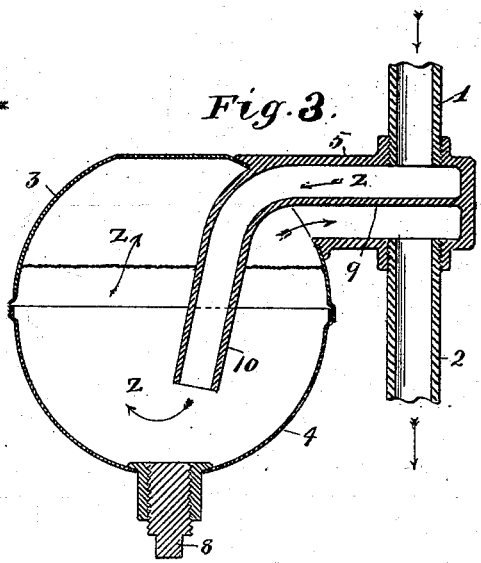
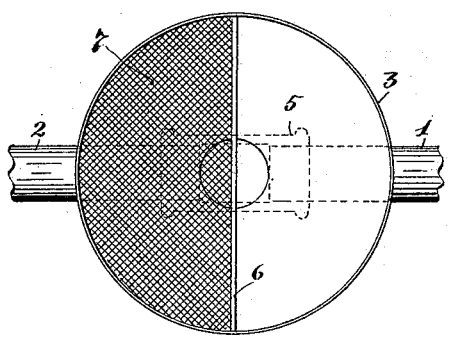
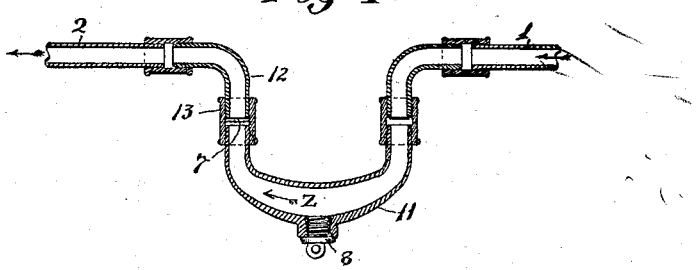
Witnesses
R. Blume
C. H. Rossman
Inventor
Charles S. White
By Attorney
P. H. Gunckel

UNITED STATES PATENT OFFICE.

CHARLES S. WHITE, OF MINNEAPOLIS, MINNESOTA, ASSIGNOR OF ONE-HALF TO J. SHUEY BEAR, OF SAME PLACE, AND GEORGE N. MORAN, OF EDEN PRAIRIE, MINNESOTA.

GASOLENE-FILTER.

SPECIFICATION forming part of Letters Patent No. 604,450, dated May 24, 1898.

Application filed June 17, 1895. Serial No. 553,006. (No model.)

*To all whom it may concern:*

Be it known that I, CHARLES S. WHITE, a citizen of the United States, residing in the city of Minneapolis, county of Hennepin, and State of Minnesota, have invented a certain new and useful Improvement in Gasolene-Filters, of which the following is a specification.

My present invention relates to gasolene-filters provided between the point of supply and the point of ignition in stoves, engines, lighting apparatus, &c.; and it has for its object improvement of the devices shown in Patent No. 536,364, dated March 26, 1895, issued upon my application for improvement in filters for gasolene-stoves. In the patent referred to the supply-conduit is shown in Figure 2 as terminating at a point very little below the filtering-screen and in Fig. 4 as terminating on the plane of the screen. In such construction there is a possibility of the settling-chamber becoming filled with water, sediment, &c., and then the pressure of the gasolene may possibly force through the screen a portion of such accumulated matter with objectionable results. In the present improvement the inflow is brought down (by means of a pipe, partition, or otherwise) to a point low enough to enable the water and other matter accumulated in the settling-chamber to form a seal, effectually preventing the passage of objectionable substances upward through the screen and serving also to extinguish the flame by preventing the flow of gasolene when the seal is sufficient to resist its pressure, and so while the apparatus is thus rendered safe warning is given when the settling-chamber contains sufficient residuum to require cleansing.

My improvements are illustrated in the accompanying drawings, in which—

Fig. 1 is a vertical sectional view of a gasolene-filter embodying one form of the improvements arranged to be applied to horizontal pipes. Fig. 2 is a view of the device of Fig. 1 from beneath, the drip-cup having been removed. Fig. 3 is a view similar to Fig. 1, showing the improvements applied in another form and arranged to be applied to vertical pipes; and Fig. 4 shows an elevation of a further modification in form of an ordinary water-trap. Many other modifications might be shown, but it is deemed unnecessary, as they would occur readily to a constructor who is skilled in the art.

In such drawings, 1 designates an inflow and 2 an outflow pipe, the two being intermediate a source of gasolene-supply and the place of ignition, and the filter is made to serve as a connection between the two portions of pipe. The filtering device is preferably composed of a two-part shell of sheet metal 3 and 4, the lower member being secured to the upper by soldering or in any other desirable way, and the upper member is soldered or otherwise attached to a coupling 5, which unites the two sections of pipe, and they are thus placed in communication with the chamber of the filter. As illustrated in Fig. 1, this chamber is divided by a vertical partition 6, extending from the top between the inflow and outflow pipes to a point well down toward the bottom of the chamber. On the outflow side a suitable distance above the lower end of the partition 6 is provided a screen 7, of finely-woven wire-cloth or other material suited to serve as a filtering medium. At the bottom of the chamber is a screw-plug 8, which can be removed when necessary to discharge water and other matter that has accumulated in the filter.

As illustrated in Fig. 3, the shell is connected to a coupling 5, which has a horizontal partition 9, separating it into upper and lower halves, and the upper half is in communication with a pendent inflow-pipe 10, which extends into the lower portion of the filter-chamber, and the screen 7 extends across the upper portion of the chamber a suitable distance above the pipe 10.

In Fig. 4 the device illustrated is a U-shaped trap 11, having its upper portion 12 at the outflow side secured by a coupling 13 or in any other well-known way to the other portion. A screen medium 7 is provided at or near this joint.

In use of either of the forms of devices shown or modifications thereof the gasolene is forced to pass to a point some distance below the screening medium and to rise to and pass through the latter in its course to the outlet, the course of the flow being indicated by the arrows z. By this arrangement heavy particles, as well as liquid of greater specific gravity than gasolene, are allowed to settle in the bottom of the filter-chamber, and particles light enough to float on the gasolene are arrested by the screening medium. Water and other foreign matter thus separated will settle in the bottom of the chamber without preventing the proper flow of gasolene until the accumulation is sufficient to rise above the bottom of the partition 6 or end of the pipe 12 or otherwise form a seal, and when this condition arises and the weight of gasolene is not sufficient to displace the water or other matter so accumulated and force it on toward the burner the flow will cease and the flame be extinguished, giving notice that the filter needs cleaning. As will be obvious, it is impracticable to state the exact relative positions of the base of the partition or inflow-pipe and screens or the degree of separation of either from the bottom of the settling-chamber, for these must vary somewhat, dependent upon the kind of stove, gasolene-burner, engine, &c., in which they are used and the quantity of gasolene intended to be used in the supply-tank; but these are matters which the constructor can readily determine with very little experiment. In the filters I use for ordinary gasolene stoves or burners which have supply-tanks for holding about a gallon of gasolene the partition is made to extend about an inch and a half below the screen and within about a half or three-quarters of an inch from the bottom of the chamber, and when so constructed the service is entirely satisfactory.

Having described my invention, what I claim is—

1. The combination with a pipe for conducting gasolene to a burner, of a filter consisting of a hollow body providing downward inflow and upward outflow conduits in communication only near the bottom of the chamber of said hollow body, and a screen in the outflow-conduit arranged suitably above the plane of communication between the conduits, and means for removing settlings from said chamber, substantially as set forth.

2. The combination with a pipe for conducting gasolene from a source of supply to a burner, of a filtering device consisting of a downwardly-curved section coupled into the pipe and provided with a filtering medium arranged to intercept the upward flow from such curved section to the outflow-pipe, substantially as set forth.

CHAS. S. WHITE.

Witnesses:
P. H. GUNCKEL,
J. SHUEY BEAR.